(12) United States Patent
Liang et al.

(10) Patent No.: US 8,866,030 B2
(45) Date of Patent: Oct. 21, 2014

(54) KEYBOARD MOUNTING APPARATUS

(75) Inventors: Wei-Kuang Liang, New Taipei (TW);
Quan-Guang Du, Shenzhen (CN);
Chun Tang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 305 days.

(21) Appl. No.: 13/442,003

(22) Filed: Apr. 9, 2012

(65) Prior Publication Data
US 2013/0032460 A1    Feb. 7, 2013

(30) Foreign Application Priority Data

Aug. 5, 2011    (CN) .......................... 2011 1 0223584

(51) Int. Cl.
*H01H 13/70*    (2006.01)
*G06F 1/16*    (2006.01)
(52) U.S. Cl.
CPC .................................. *G06F 1/1662* (2013.01)
USPC ..................................... 200/5 A; 361/679.02

(58) Field of Classification Search
CPC ......... H01H 13/70; G06F 1/16; G06F 1/1662; G06F 1/1669; G06F 1/1679; G06F 1/1681; G06F 1/1666; H05K 5/00; H05K 7/00
USPC ................ 200/5 A, 5 R; 361/679.02, 679.08, 361/679.09, 679.11, 679.13–679.17
See application file for complete search history.

(56) References Cited

U.S. PATENT DOCUMENTS

| | | | |
|---|---|---|---|
| 6,467,683 B2 * | 10/2002 | Jun .............................. | 200/344 |
| 6,542,355 B1 * | 4/2003 | Huang ..................... | 361/679.08 |
| 7,733,636 B2 * | 6/2010 | Kobayashi et al. ...... | 361/679.08 |
| 8,564,940 B2 * | 10/2013 | Yang ........................ | 361/679.08 |

* cited by examiner

*Primary Examiner* — Amy Cohen Johnson
*Assistant Examiner* — Marina Fishman
(74) *Attorney, Agent, or Firm* — Novak Druce Connolly Bove + Quigg LLP

(57) ABSTRACT

A mounting apparatus secures a keyboard to a base. The keyboard defines a plurality of nicks. The base comprises a supporting member and a receiving member installed on the supporting member. A plurality of resilient pieces is located on the supporting member. The receiving member defines a plurality of through holes allowing the resilient pieces to extend through. Each of the resilient pieces is elastically deformable to be over the keyboard to engage in each of the nicks.

20 Claims, 6 Drawing Sheets

KEYBOARD MOUNTING APPARATUS

BACKGROUND

1. Technical Field

The present disclosure relates to mounting apparatuses, and particularly to a mounting apparatus for a computer keyboard.

2. Description of Related Art

A typical personal computer includes a keyboard and a base. The keyboard may be attached to the base with screws. A tool, such as a screwdriver, may be used to fasten or unfasten the screws when the keyboard is assembled or disassembled. The processes to assemble or disassembly the keyboard may be laborious and time-consuming.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
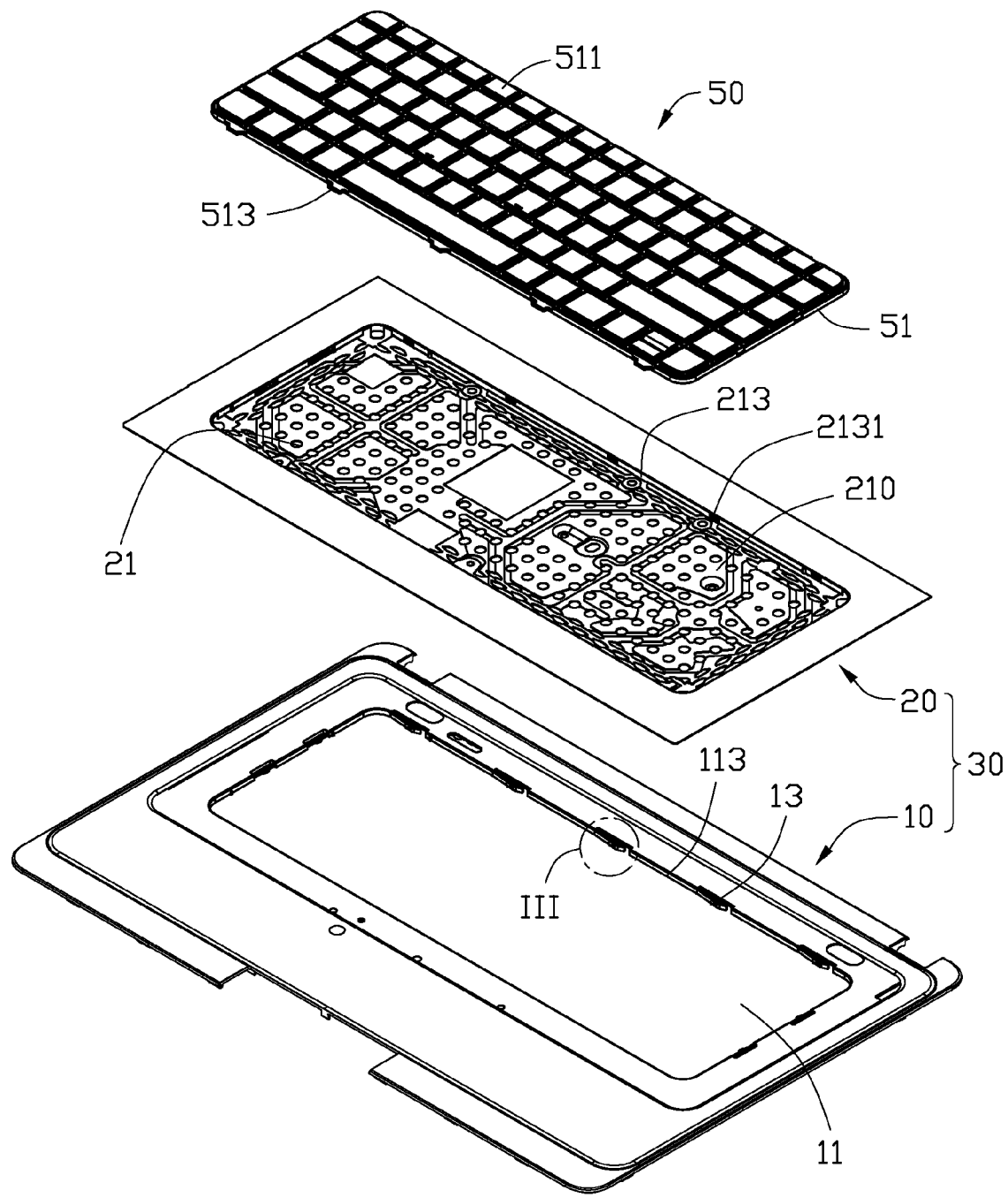
FIG. 1 is an exploded, isometric view of an embodiment of a mounting apparatus and a keyboard.

FIG. 1, is a mounting apparatus configured to secure a keyboard 50 to a base 30.

The base 30 includes a supporting member 10 and a receiving member 20. The supporting member 10 defines an opening 11 and a slot 12 around the opening 11. A first edge 111 of the opening 11 defines a plurality of cutouts 1111 communicating with the opening 11. A second edge 113 of the opening 11 defines a plurality of gaps 1131 communicating with the opening 11. In one embodiment, the number of the plurality of cutouts 1111 is equal to the number of the plurality of gaps 1131. Each of the plurality of gaps 1131 includes a blocking wall 1332 substantially parallel to the second edge 113. A plurality of resilient pieces 13 are located on the supporting member 10. Each of the plurality of resilient pieces 13 is arranged at each of the plurality of gaps 1131.

Figure 3:
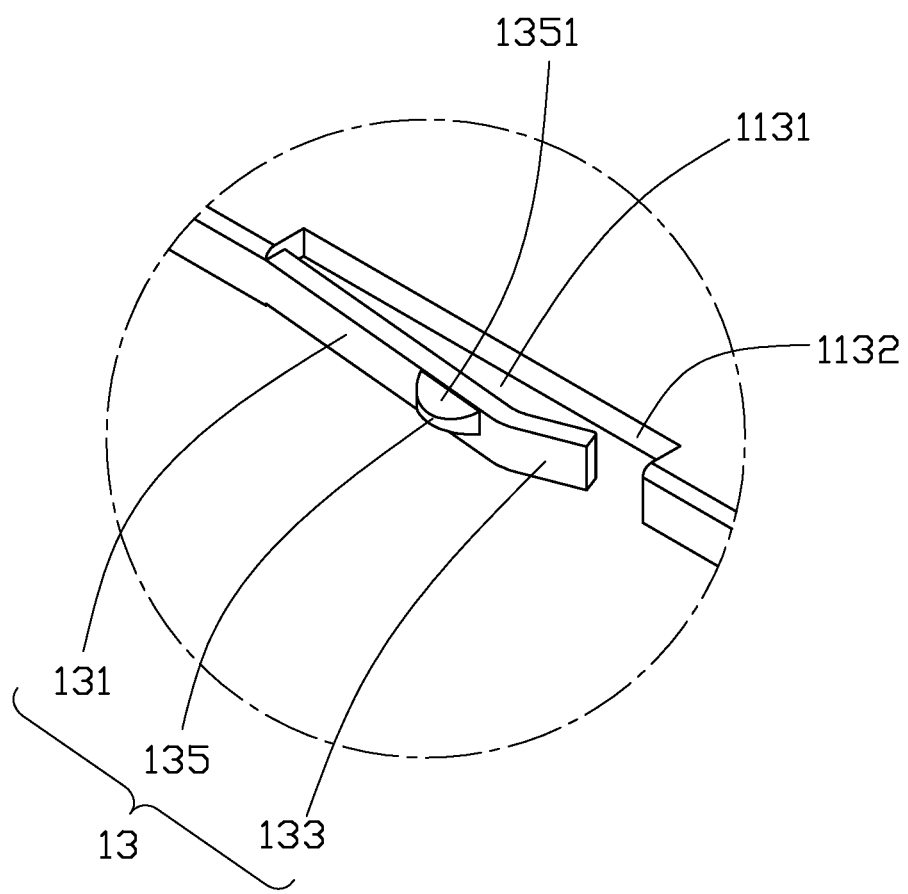
FIG. 3 is an enlarged view of a circled portion III of FIG. 1.

Referring to FIG. 3, each of the plurality of resilient pieces 13 includes a connecting portion 131, a resilient portion 133 and a latching portion 135. The connecting portion 131 extends from an edge of each of the plurality of gaps 1131. In one embodiment, an acute angle is defined between a first end of the connecting portion 131 and an edge of each of the plurality of gaps 1131. The resilient portion 133 extends towards each of the plurality of gaps 1131 from a second end opposite to the first end of the connecting portion 131. In one embodiment, an obtuse angle is defined between the connecting portion 131 and the resilient portion 133. The latching portion 135 extends from the connecting portion 131 and adjacent to the resilient portion 133. The resilient portion 133 and the latching portion 135 are located at two sides of the connecting portion 131. In one embodiment, the latching portion 135 is substantially arc-shaped. The latching portion 135 comprises a guiding portion 1351. In one embodiment, the guiding portion 1351 is a beveled surface.

Figure 2:
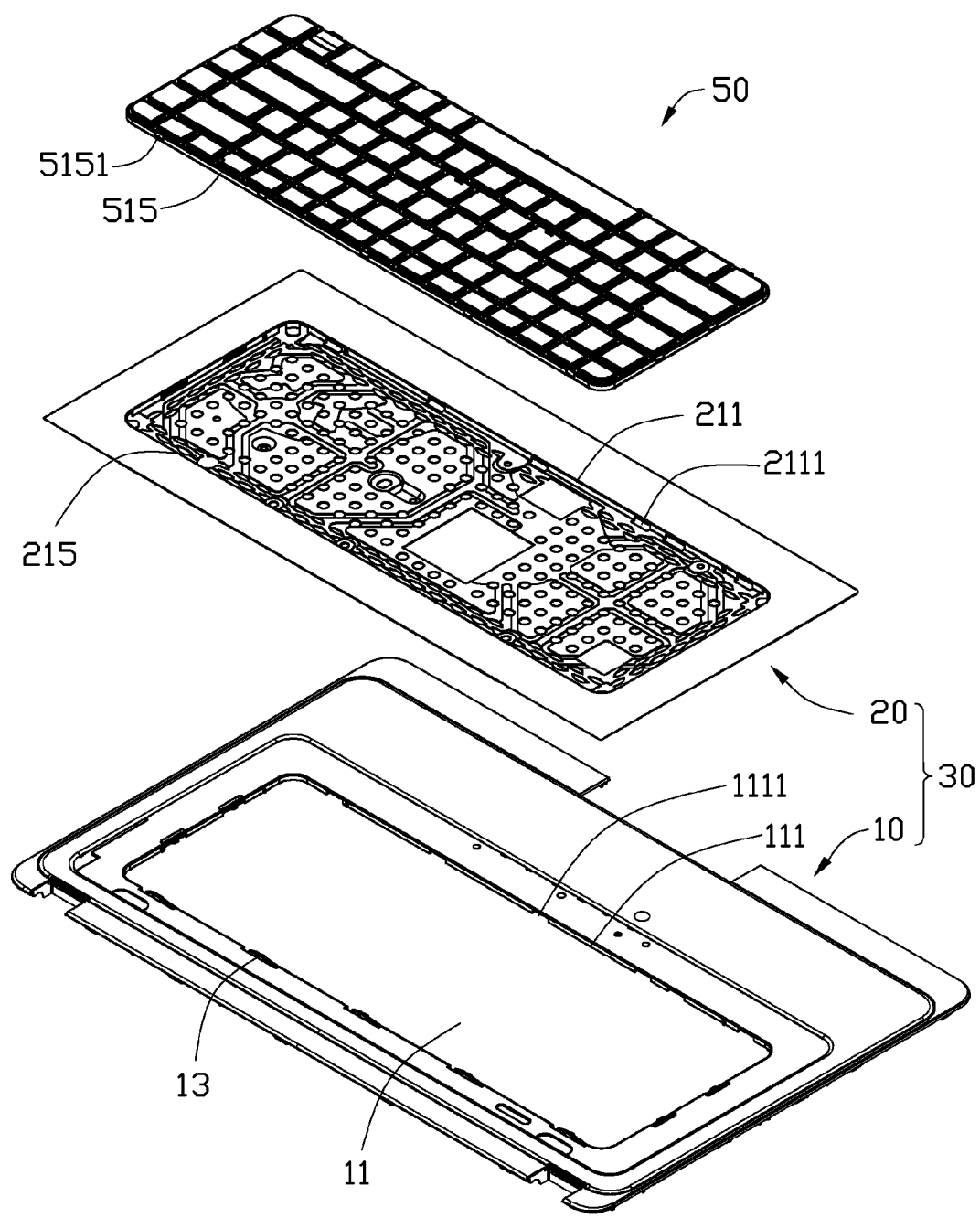
FIG. 2 is similar to FIG. 1, but viewed from another aspect.

FIGS. 1-2, show the receiving member 20 including a receiving portion 21. The receiving portion 21 includes a bottom wall 210, a first sidewall 211 and a second sidewall 213. The bottom wall 210, the first sidewall 211 and the second sidewall 213 cooperatively define a receiving space 215 for receiving the keyboard 50. In one embodiment, the first sidewall 211 is substantially parallel to the second sidewall 213 and substantially perpendicular to the bottom wall 210. The first sidewall 211 defines a plurality of installation holes 2111 corresponding to the plurality of cutouts 1111. The second sidewall 213 defines a plurality of through holes 2131 corresponding to the plurality of resilient pieces 13.

The keyboard 50 includes a main board 51. A plurality of keys 511 is located on the main board 51. A plurality of tabs 513 extends from a first side of the main board 51. A hem 515 extends from a second side opposite to the first side of the main board 51. The hem 515 defines a plurality of nicks 5151 corresponding to the plurality of resilient pieces 13.

Figure 4:
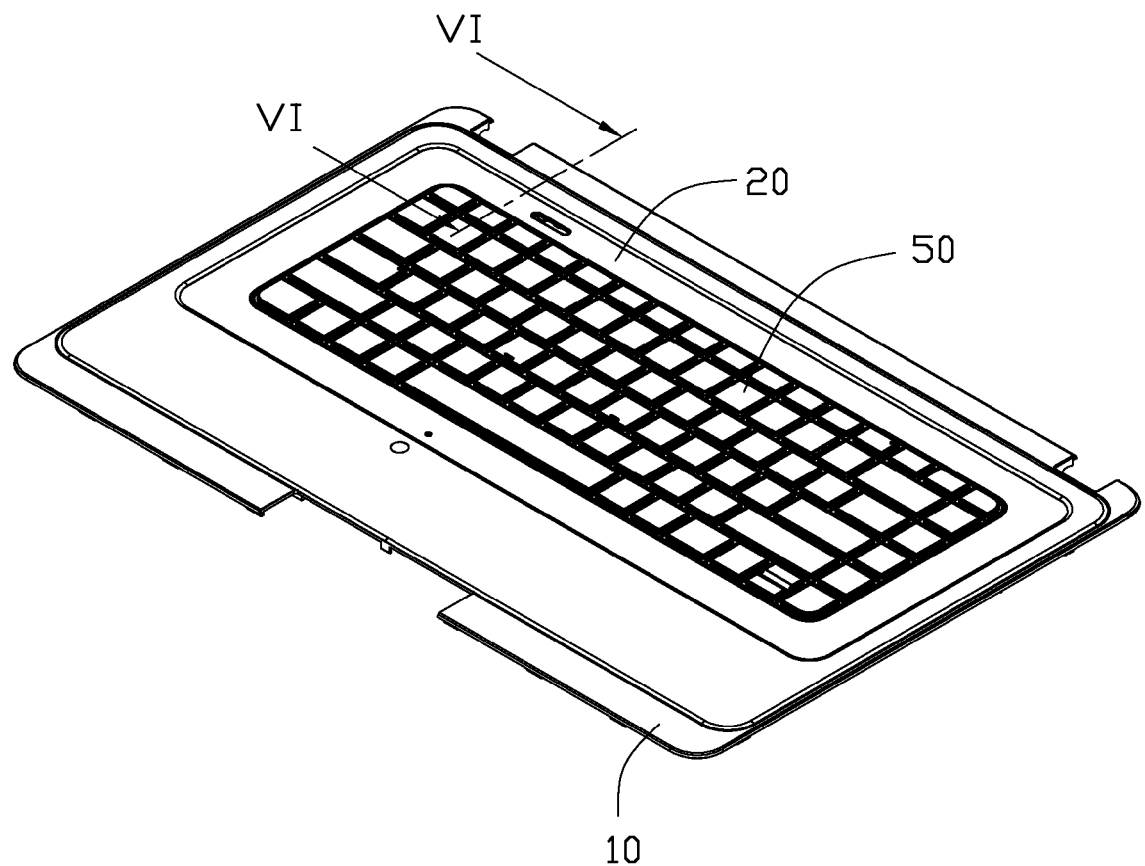
FIG. 4 is an assembled, isometric view of the mounting apparatus and the keyboard of FIG. 1.
Figure 5:
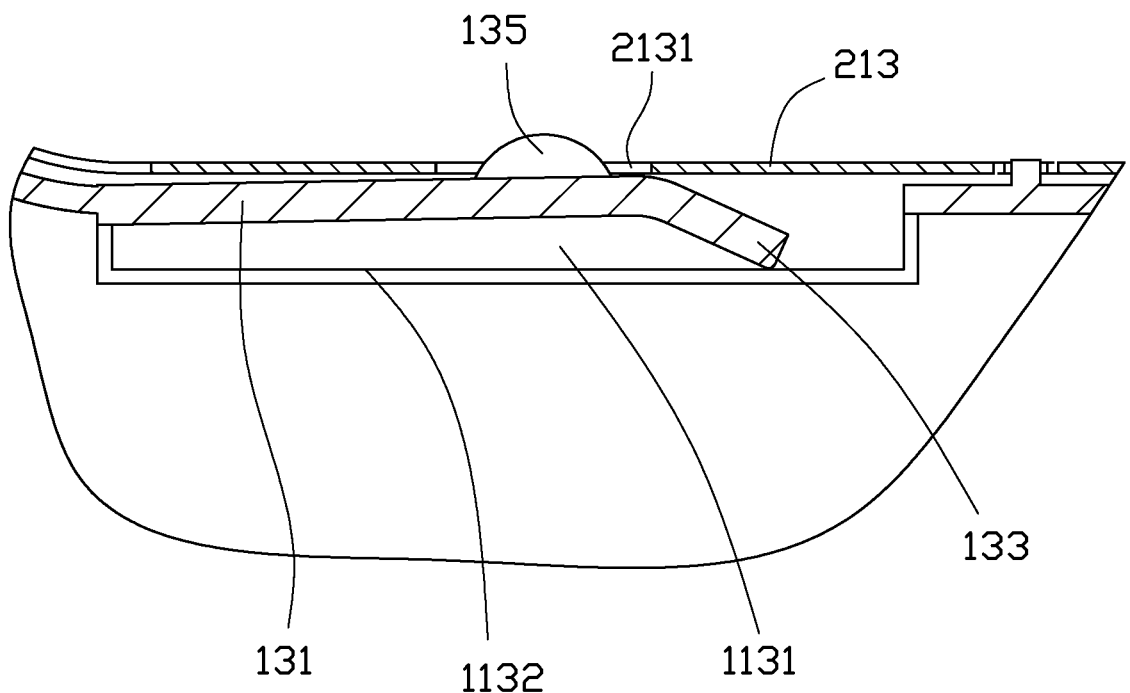
FIG. 5 is a cutaway, cross-sectional view of a supporting member and a receiving member.
Figure 6:
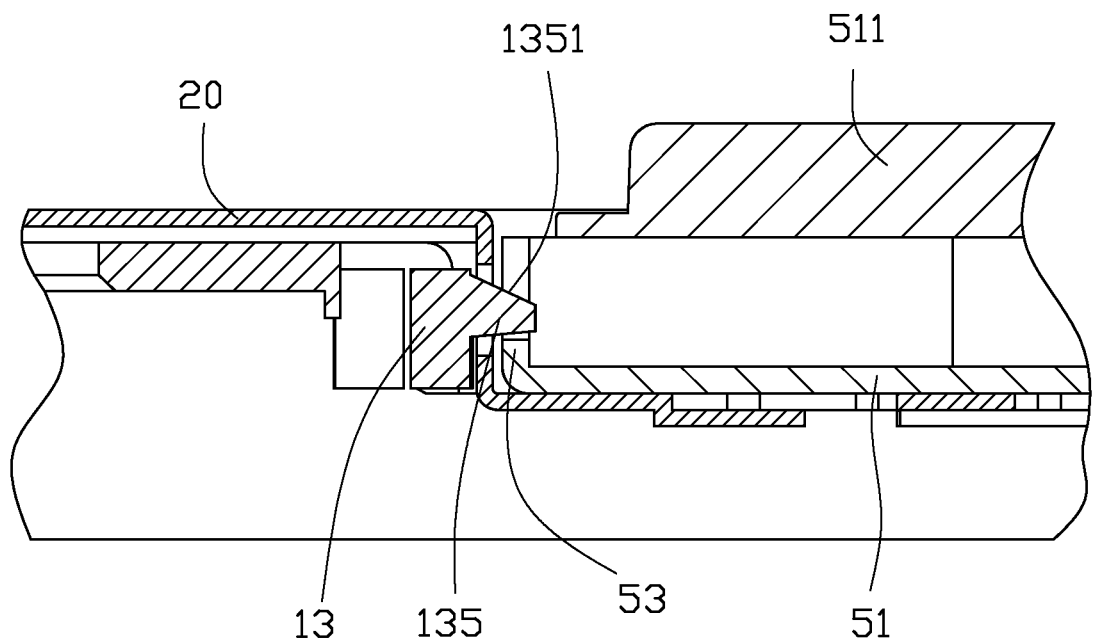
FIG. 6 is cutaway, cross-sectional view of the mounting board and the keyboard of FIG. 4, taken along the line VI-VI.

FIGS. 4-5, show in assembly, the receiving portion 21 is received in the opening 11 of the receiving member 20. The plurality of installation holes 2111 of the first sidewall 211 are aligned with the plurality of cutouts 1111 of the first edge 111. Each of the latching portions 135 is inserted through each of the plurality of through holes 2131 and exposed outside of the second sidewall 213. The receiving member 20 is thereby installed on the supporting member 10.

In assembly of the keyboard 50, each of the plurality of tabs 513 is inserted into each of the plurality of installation holes 2111 and each of the plurality of cutouts 1111. The keyboard 50 is pressed, and the hem 515 is slid along the guiding portion 1351 to the latching portion 135, moving along a first direction, until the latching portion 135 abuts the hem 515. The latching portion 135 is in a first position. The resilient portion 133 abuts the blocking wall 1332 to be elastically deformed. The keyboard 50 continues to press to the latching portion 135 to align with the nick 5151, and the resilient portion 133 elastically returns to resist the latching portion 135, moving along a second direction opposite to the first direction engaging in the nick 5151. The latching portion is positioned in a second position. The keyboard 50 is thereby installed in the base 30.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An assembly comprising:
   a keyboard, the keyboard defining a plurality of nicks; and
   a base defining a receiving space configured to receive the keyboard, the base comprising a supporting member and a receiving member installed on the supporting member, a plurality of resilient pieces located on the supporting member, the receiving member defining a plurality of through holes, each of the plurality of resilient pieces extends through each of the plurality of through holes, each of the plurality of resilient pieces is engaged in each of the plurality of nicks to preventing the keyboard disengaging from the base, and the plurality of resilient pieces are elastically deformable to disengage from the plurality of nicks.

2. The assembly of claim 1, wherein each of the plurality of resilient pieces comprises a connecting portion and a resilient portion, an obtuse angle is defined between the connecting portion and the resilient portion.

3. The assembly of claim 2, wherein each of the resilient pieces further comprises a latching portion located on the connecting portion, and the latching portion extends through each of the plurality of through holes to engage in each of the plurality of nicks.

4. The assembly of claim 3, wherein the keyboard comprises a main board and a plurality of tabs extending from a first side of the main board, the supporting member defines a plurality of cutouts, the receiving member defines a plurality of installation holes, and each of the plurality of tabs extends through each of the plurality of cutouts to engage in each of the plurality of installation holes.

5. The assembly of claim 4, wherein the latching portion comprises a guiding portion, the keyboard comprises a hem extending from a second side opposite to the first side of the main board, and the hem is slideable along the guiding portion to bias and elastically deformed the resilient portion.

6. The assembly of claim 3, wherein the latching portion is substantially arc-shaped.

7. The assembly of claim 3, wherein each of the latching portion and the resilient portion is located on each opposite side of the connecting portion.

8. The assembly of claim 1, wherein the receiving member comprises a receiving portion, the supporting member defines an opening, and the receiving portion is received in the opening.

9. The assembly of claim 8, wherein the receiving portion comprises bottom wall, a first sidewall and a second sidewall; and the bottom wall, the first sidewall and the second sidewall cooperatively define the receiving space.

10. The assembly of claim 9, wherein the supporting member defines a plurality of gaps communicating with the opening, and each of the plurality of resilient pieces is arranged at each of the plurality of gaps and connected to one edge of each of the plurality of gaps.

11. An assembly comprising:
a keyboard, the keyboard defining a plurality of nicks;
a base defining a receiving portion configured to received the keyboard, the base comprising a supporting member and a receiving member located on the supporting member, a plurality of resilient pieces located on the supporting member, each of the plurality of resilient pieces comprising a latching portion, the receiving member defining a plurality of through holes for the plurality of latching portions extending through;
wherein the plurality of resilient pieces are elastically deformable to move between a first position and a second position; when the plurality of resilient pieces are in a first position, the latching portion is disengaged from each of the plurality of nicks; and when the plurality of resilient pieces are in the second position, the latching portion is engage in each of the plurality of nicks.

12. The assembly of claim 11, wherein each of the plurality of resilient pieces further comprises a connecting portion and a resilient portion extending from the connecting portion, and an obtuse angle is defined between the connecting portion and the resilient portion.

13. The assembly of claim 12, wherein the latching portion is located on the connecting portion and opposite to the resilient portion, and the resilient portion is elastically deformable to move the latching portion from the second position to the first position.

14. The assembly of claim 13, wherein the keyboard comprises a main board and a plurality of tabs extending from a first side of the main board, the supporting member defines a plurality of cutouts, the receiving member defines a plurality of installation holes, and each of the plurality of tabs extends through each of the plurality of cutouts to engage in each of the plurality of installation holes.

15. The assembly of claim 14, wherein the latching portion comprises a guiding portion, the keyboard comprises a hem extending from a second side opposite to the first side of the main board, and the hem is slideable along the guiding portion to bias and elastically deform the resilient portion.

16. The assembly of claim 15, wherein the hem is substantially perpendicular to the main board.

17. The assembly of claim 15, wherein the guiding portion is an inclined surface.

18. The assembly of claim 11, wherein the supporting member defines an opening, and the receiving portion is received in the opening.

19. The assembly of claim 18, wherein the supporting member defines a plurality of gaps communicating with the opening, and each of the resilient pieces is arranged at each of the plurality of gaps and connected to one edge of each of the plurality of gaps.

20. The assembly of claim 11, wherein the latching portion is substantially arc-shaped.

* * * * *